US012245667B2

(12) United States Patent
Finn

(10) Patent No.: US 12,245,667 B2
(45) Date of Patent: Mar. 11, 2025

(54) JEWELRY ILLUMINATION SYSTEM

(71) Applicant: Bruce Leon Finn, Sherman Oaks, CA (US)

(72) Inventor: Bruce Leon Finn, Sherman Oaks, CA (US)

( * ) Notice: Subject to any disclaimer, the term of this patent is extended or adjusted under 35 U.S.C. 154(b) by 0 days.

(21) Appl. No.: 16/030,811

(22) Filed: Jul. 9, 2018

(65) Prior Publication Data

US 2019/0014872 A1 Jan. 17, 2019

Related U.S. Application Data

(60) Provisional application No. 62/531,300, filed on Jul. 11, 2017.

(51) Int. Cl.

| | |
|---|---|
| ***F21S 4/24*** | (2016.01) |
| ***A44C 7/00*** | (2006.01) |
| ***A44C 15/00*** | (2006.01) |
| ***A44C 25/00*** | (2006.01) |
| ***F21V 3/00*** | (2015.01) |
| ***F21V 23/00*** | (2015.01) |
| ***F21V 23/02*** | (2006.01) |
| *F21Y 115/10* | (2016.01) |

(52) U.S. Cl.

CPC ............ *A44C 15/0015* (2013.01); *A44C 7/00* (2013.01); *A44C 15/0005* (2013.01); *A44C 15/0045* (2013.01); *A44C 15/005* (2013.01); *A44C 25/001* (2013.01); *F21S 4/24* (2016.01); *F21V 3/00* (2013.01); *F21V 23/003* (2013.01); *F21V 23/02* (2013.01); *F21Y 2115/10* (2016.08)

(58) Field of Classification Search

CPC ... A44C 15/0015; A44C 7/00; A44C 15/0005; A44C 15/0045; A44C 15/005; A44C 25/001; F21S 4/24; F21V 3/00; F21V 23/003; F21V 23/02; F21Y 2115/10

See application file for complete search history.

(56) References Cited

U.S. PATENT DOCUMENTS

| | | | | | |
|---|---|---|---|---|---|
| 3,119,563 | A * | 1/1964 | Ruffman | F21L 2/00 | 40/329 |
| 3,392,275 | A * | 7/1968 | Henrich | A44C 15/0015 | 63/23 |
| 3,624,384 | A * | 11/1971 | Ledingham | F21L 2/00 | 362/104 |
| 4,012,629 | A * | 3/1977 | Simms | F21L 4/00 | 362/208 |
| 5,477,433 | A * | 12/1995 | Ohlund | A44C 15/0015 | 362/183 |
| 5,504,664 | A * | 4/1996 | Ostema | A44C 15/0015 | 362/104 |

(Continued)

FOREIGN PATENT DOCUMENTS

JP H09164008 A * 6/1997

*Primary Examiner* — Elmito Breval

(74) *Attorney, Agent, or Firm* — Alexander Postnikov

(57) ABSTRACT

Illuminated jewelry wearable as earrings, body rings, necklaces or the like includes a single or multiple light source(s) that cast, scrape, front light and otherwise illuminate the jewelry desired either incorporated there in or adjacently. Additional desirous effects may include body/skin illumination directly, indirectly, reflected or refracted. Light source(s) can include LED(s), chemo luminescence, incandescent, electro luminescent or other.

20 Claims, 10 Drawing Sheets

(56) References Cited

U.S. PATENT DOCUMENTS

| | | | | | |
|---|---|---|---|---|---|
| 5,876,109 | A * | 3/1999 | Scalco | A44C 15/0015 | 362/104 |
| 6,296,364 | B1 * | 10/2001 | Day | A44C 15/0015 | 362/103 |
| 6,433,483 | B1 * | 8/2002 | Michael | A44C 15/0015 | 315/200 A |
| 6,833,539 | B1 * | 12/2004 | Maeda | A44C 15/0015 | 250/214 AL |
| 2002/0089859 | A1 * | 7/2002 | Jackson | A44C 15/0015 | 362/571 |
| 2003/0167795 | A1 * | 9/2003 | Metcalfe | A44C 15/0015 | 63/1.14 |
| 2006/0059947 | A1 * | 3/2006 | Gore | A44C 5/00 | 63/1.13 |
| 2006/0262531 | A1 * | 11/2006 | Schrimmer | G02B 6/001 | 362/240 |
| 2007/0236928 | A1 * | 10/2007 | Hsu | A44C 15/0015 | 362/231 |
| 2015/0009654 | A1 * | 1/2015 | Chan | H05B 33/086 | 362/104 |
| 2015/0313329 | A1 * | 11/2015 | Flanery | A44C 9/00 | 63/1.11 |
| 2016/0037883 | A1 * | 2/2016 | Keeler | A44C 15/0015 | 63/1.11 |
| 2017/0164878 | A1 * | 6/2017 | Connor | A61B 5/14532 | |
| 2017/0231336 | A1 * | 8/2017 | Disinger | A44C 25/001 | 63/1.13 |
| 2017/0343888 | A1 * | 11/2017 | Raskin | G03B 15/02 | |
| 2018/0000205 | A1 * | 1/2018 | Chinowsky | F21V 33/0008 | |

* cited by examiner

JEWELRY ILLUMINATION SYSTEM

BACKGROUND OF THE INVENTION

Scope of Invention

This invention relates generally to illuminated jewelry and more particularly to LED or other type of jewelry that illuminates (casts light) on portions of itself and/or adjacent jewelry or the skin of the wearer.

Related Art

It is well known to utilize illuminated jewelry for backlit translucent crystal earrings, inexpensive bracelets, necklaces and rings, illuminated translucent medallions and other costume jewelry applications.

U.S. Pat. No. 5,504,664 of Ostema shows a tiny battery housing and stem that connects to a conductive rubber material and back lights a plastic crystal.

This popular product certainly has it's place and market.

These types of costume jewelry are not designed to illuminate the front or reflective facets of jewelry pieces such as crystals and diamonds, adjacent jewelry or the skin of the wearer.

U.S. Pat. No. 5,951,158 describes a single source earring housing with fiber optic "tentacles" that can be placed in the adjacent hair to illuminate it.

U.S. Pat. No. 7,318,328 describes a backlit translucent medallion (much like the backlit crystals of Ostema) incorporated on a necklace chain with the battery power supply hidden behind the neck of the wearer.

In my previous U.S. Pat. No. 8,376,564 Fashion Illumination System in which I was the Inventor, an item of jewelry is disclosed that houses a light source to direct constant visible illumination at the wearer's adjacent skin.

The present invention represents a leap forward above the described prior art of a jewelry illumination system that can include illumination of diamonds, precious stones, metals and other jewelry pieces directly or adjacently and/or the skin of the wearer.

BRIEF SUMMARY OF THE INVENTION

What is needed is a system to "scrape" jewelry with light and/or illuminate jewelry with a self contained, wearable light source housed in or by said jewelry that can light itself and/or illuminate adjacent jewelry and/or the skin of the wearer.

Diamonds require "front" light illumination to reflect in it's facets for optimal effect. It is desirable to produce the most fire, brilliance and scintillation as possible from many pieces of jewelry however there has not been a jewelry illumination system to date that "front" lights or "scrapes" faceted stones such as diamonds or crystals with light designed to optimally achieve these results. These dazzling effects can be increased further as the color and quality of light is chosen plus the relationship between the light source(s) and the cut stone change as in the picture frame embodiment where the stone is suspended (free hanging) within the light frame.

Although there have been major advances in LED lighting technology and the architectural, photographic, automotive and theatrical lighting industries have all shown tremendous use of new technologies the jewelry industry has not evolved into use of the technology including changeable tiny, bright light sources and color control including RGB color changing.

Illuminated jewelry which began with glow sticks turned into necklaces, inexpensive plastic blinky adornments and backlit crystal earrings and such have not evolved much over decades despite significant improvements in portable tiny lighting technology nor has illumination evolved in the jewelry world to fine jewelry.

What is needed in the Jewelry industry is incorporation of the latest technologies including tiny high quality LED's and micro control systems now available to actually self illuminate jewelry pieces instead of depending on ambient lighting conditions to create sparkle in ones jewelry through reflection. Further uses of this wearable light system as described in the Fashion Illumination System will allow Jewelry pieces to be housings that contain lighting devices and emit light that can illuminate the adjacent skin of the wearer. Additionally adjacent jewelry pieces may be illuminated in this advancement.

Jewelry and specifically diamonds are often displayed in showcases utilizing direct light that is reflected by the stones thereby showing off their brilliance. The incorporation of a lighting source that is utilized when the Jewelry is worn can bring the brilliance of the piece/stone(s) as originally seen into the reality of when they are now worn at nocturnal events with evening wear etc. Technology is now possible for bright micro/tiny light sources, controllers and power to all be utilized in forms that are compact enough to be wearable either adjacent to or even incorporated into jewelry piece(s).

Imagine a beautiful crystal pendant as has been popularized by the famous Swarovski brand that now can be suspended within a very thin hoop or picture frame that houses light that surrounds the jewel. This can be accomplished with a rope light type or thin copper wire type LED system in a three walled tube structure or a concave gutter type structure. [FIG. 3]

The picture frame can be an oval, square, circle, rectangle or whatever compliments the suspended stone or other item of Jewelry. Not only could the piece contained in the picture frame be beautifully illuminated and/or excited with light being reflected in ifs facets but said light could be refracted from said piece, scrape or spill to the adjacent skin of the wearer.

The color and quality of the light could be designed as a glamorous warm glow to the skin such as in earring or necklace embodiments. The appearance of the cleavage of the wearer could be enhanced from said design as the décolletage is bathed in illumination as originally conceived in Finn's Fashion Illumination System and improved upon in this Patents teaching.

Color, intensity, pattern, blinking, fading, hue changing, beating can all be controlled to add to the look and attain different moods and effects.

Sensors could be used so stimuli such as body temperature, sound, heartbeat, motion etc could be used in control for effect.

The tubes of light described which are essentially gutters can be made of precious metals, engraved or incrusted and can be of any decorative shape or as straight tubes [FIG. 6]

Embodiments are additionally envisioned where these light garters or tubes are considered complete jewelry as they are worn without additional jewelry pieces to illuminate the skin of the wearer.

The simplest of the embodiments could be a solitaire stone with a minuscule LED mounted in a housing or covering directly above or adjacent to said stone. Picture a tiny cone or bell shaped housing that contains a light source and a power supply. Either with a crystal, diamond, or other jewel suspended beneath or without this embodiment could be worn as earrings, belly ring, nipple rings or other body adornments.

Said devices could be sans stone and just act as decorative skin illuminators in series or individually. Such devices could illuminate the adjacent skin as taught in the Finn FIS Patent. [FIG. 5]

It is envisioned that power could be from tiny battery(s), other power storage means or piezo, kinetic, scavenger, temperature, static or other energy harnessing or means.

Additional embodiments incorporate projected light through specifically translucent stones of optimal shape, angle, quality and a light source(s) which has the intensity and directional quality to not only illuminate the stone or material (as in previous practices) but to actually project a significant amount of viewable light onto the adjacent skin of the wearer. [FIG. 2] illustrates a silicone "ice cube" necklace.

Intelligent control and connectivity is envisioned including smart phone control and interactivity. These devices can be used to signal and interact with each other or be worn in groups.

Simple messages could be relayed by a partner or friends such as when it is time to go. Pieces could be worn in groups and coordinated in terms of color, intensity etc or to change in relation to or in sync with each other.

An additional embodiment is envisioned to stylistically reproduce in miniature, period type architectural iconic lighting fixtures (chandeliers) such as the three teardrop pendant cluster commonly used in modern kitchens circa 1960. Other designs envisioned to include emulated french glass type chandeliers using fiber optics, stained glass Tiffany style hanging chandeliers etc. These miniature replicas will house tiny light sources that will illuminate the adjacent skin, adjacent jewelry and/or transmit light through their translucent parts per the invention.

DETAILED DESCRIPTION OF THE INVENTION

Figure 1:
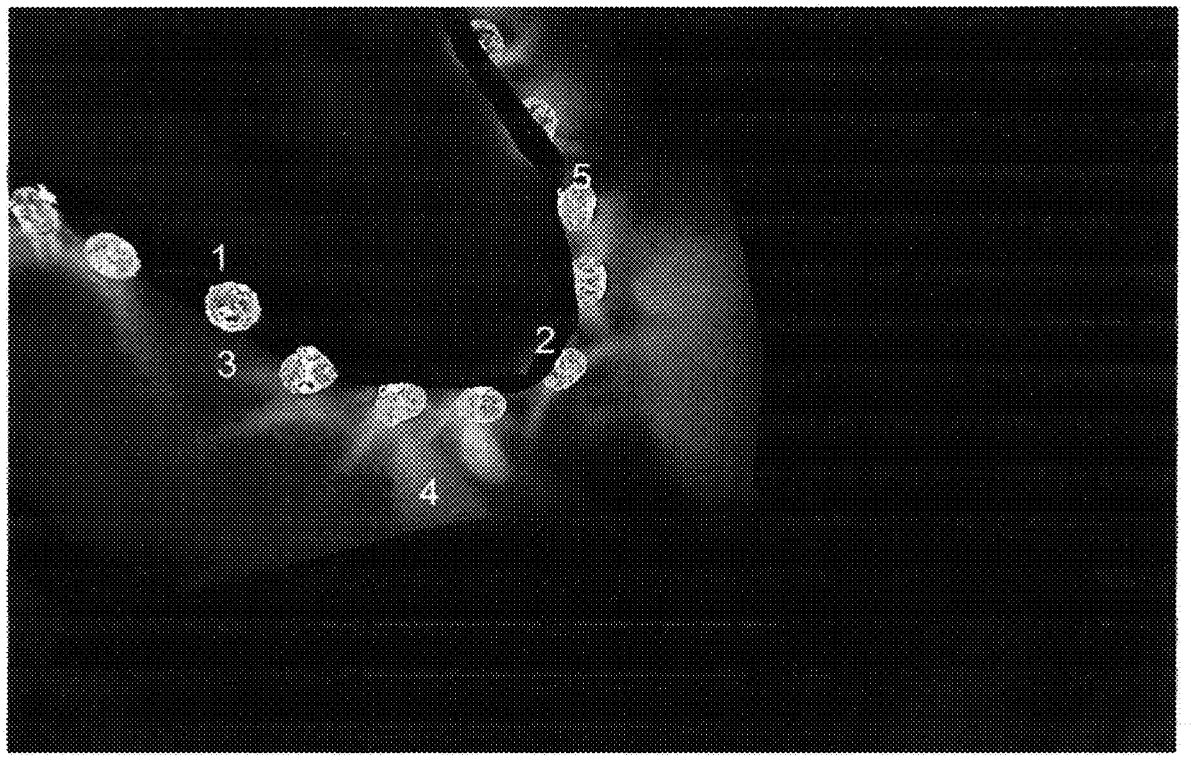
FIG. 1 is an example of the crystal bead embodiment of the invention.

Referring now to the drawings the invention is shown in FIG. 1 generally at numeral 1 large hole crystal beads are used to house the LEDs 2 mounted to directionally project through the aperture of the bead 3 (housing) onto the adjacent skin 4 and illuminate the translucent material of said bead(s) 5

Figure 2:
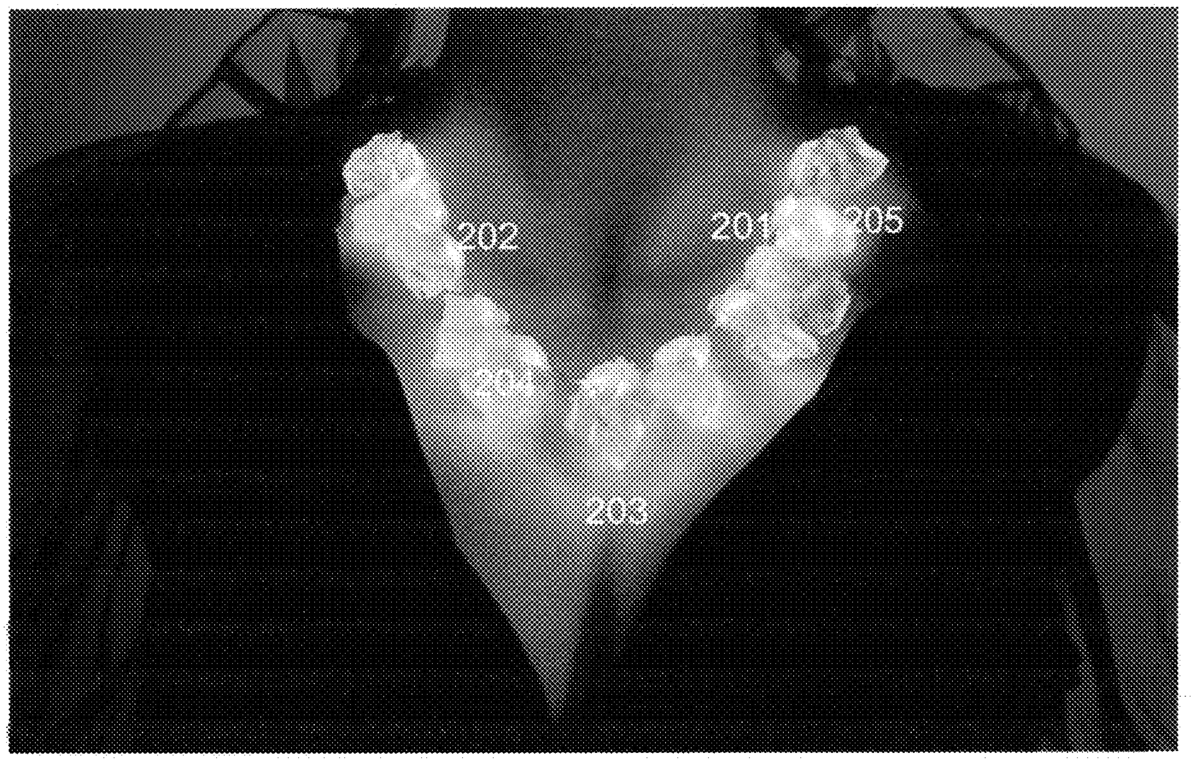
FIG. 2 is an example of the silicone cube embodiment of the invention.

As shown in FIG. 2. a flexible fabric LED light ribbon 201 is utilized with powerful, directional LED's 202 that can transmit appreciable viewable light to the adjacent skin of the wearer 203 when projected through a translucent material such as silicone cubes/chunks 204 (as shown). Although the light projected into the translucent material scatters and is absorbed to some degree this "glow" of the "backlit" material can be additionally attractive 205. The color of said light can be chosen to complement the skin tone of the wearer. In this example a warm white light is used to "glow" the adjacent skin of the wearer 203.

Figure 3:
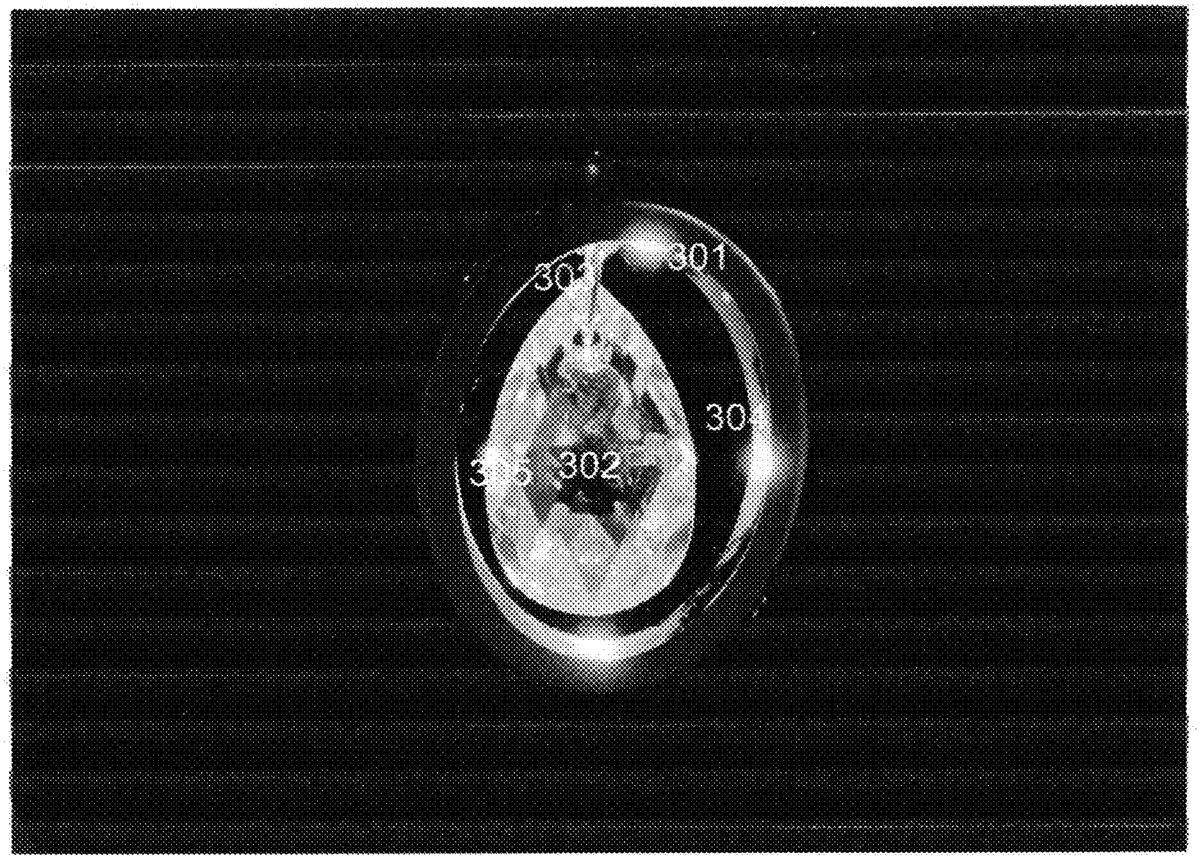
FIG. 3 is an example of the picture frame embodiment of the invention.

FIG. 3 shows the preferred "picture frame" embodiment where the suspended jewel is surrounded by a hoop or frame of light ribbon or individual light source(s) incorporated in a channel or tube or concave material (metal) surrounding said faceted stone crystal or other item of jewelry to illuminate it 301. Faceted stones, crystals etc 302 can be suspended 303 and free hanging whereby motion can create additional scintillation. The Swarovski example necklace [FIG. 3] is illuminated by the self contained light source(s) positioned in the picture frame channel 304 (or individual source(s) on posts, prongs or other in the side/front position relative to the center jewelry object as the frame shown) which causes sparkle 305 to reflect from said stones or jewelry to be illuminated regardless of ambient light or lack there of.

Figure 4:
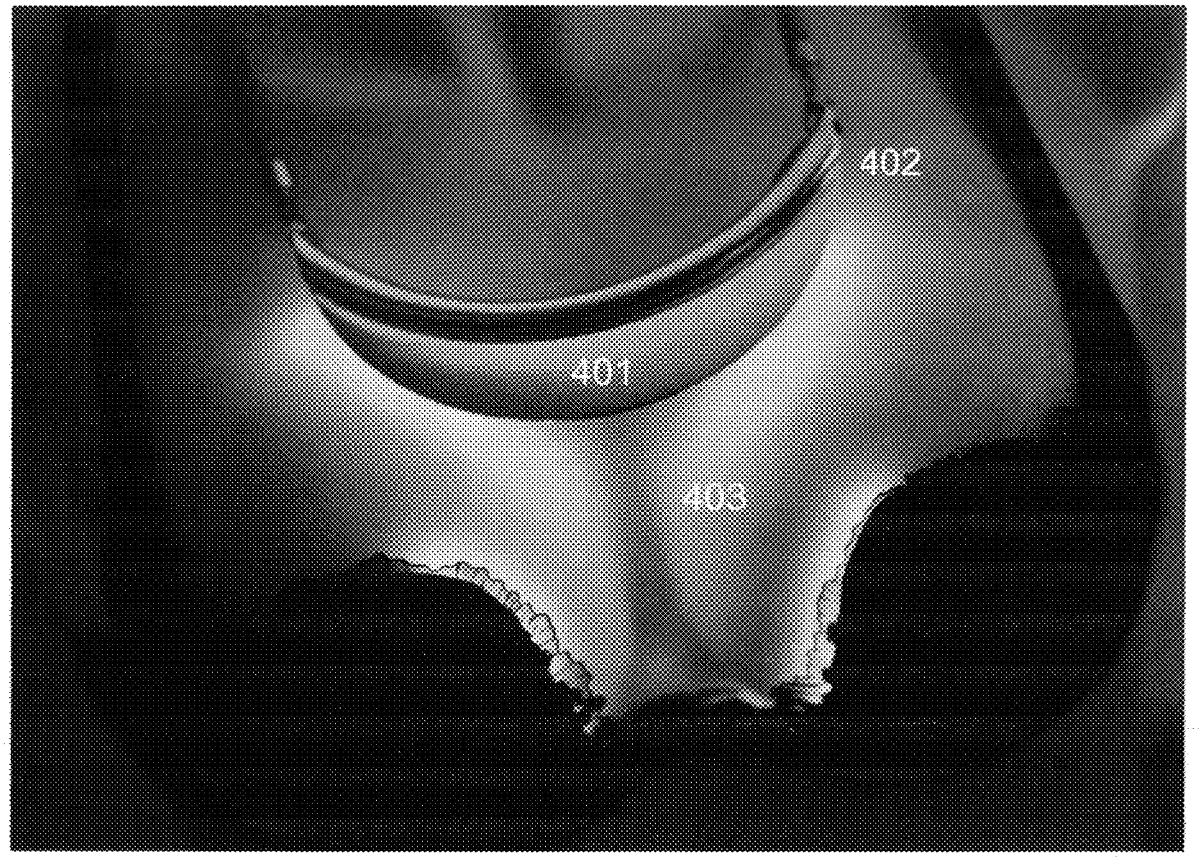
FIG. 4 is an example of the gold choker embodiment of the invention.

The gold choker necklace 401 shown in FIG. 4 is positioned 402 to throw a golden "down light" on the top surface of the breasts 403 thereby increasing the appearance of fullness.

Figure 4A:
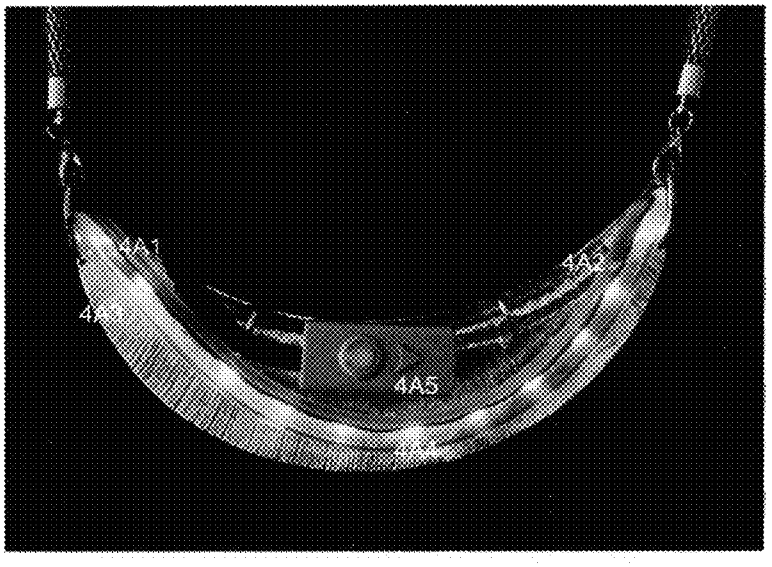
FIG. 4A is the back view of FIG. 4

FIG. 4A is the back view of FIG. 4. An LED ribbon 4A1 encased in a transparent tube 4A2 shown in FIG. 4A is used in this embodiment to attain the distance from the skin of the wearer 4A3 and proper downward orientation 4A4 of the LED light source(s). A battery housing and controller 4A5 are used for on/off and flashing/beating modes.

Figure 5:
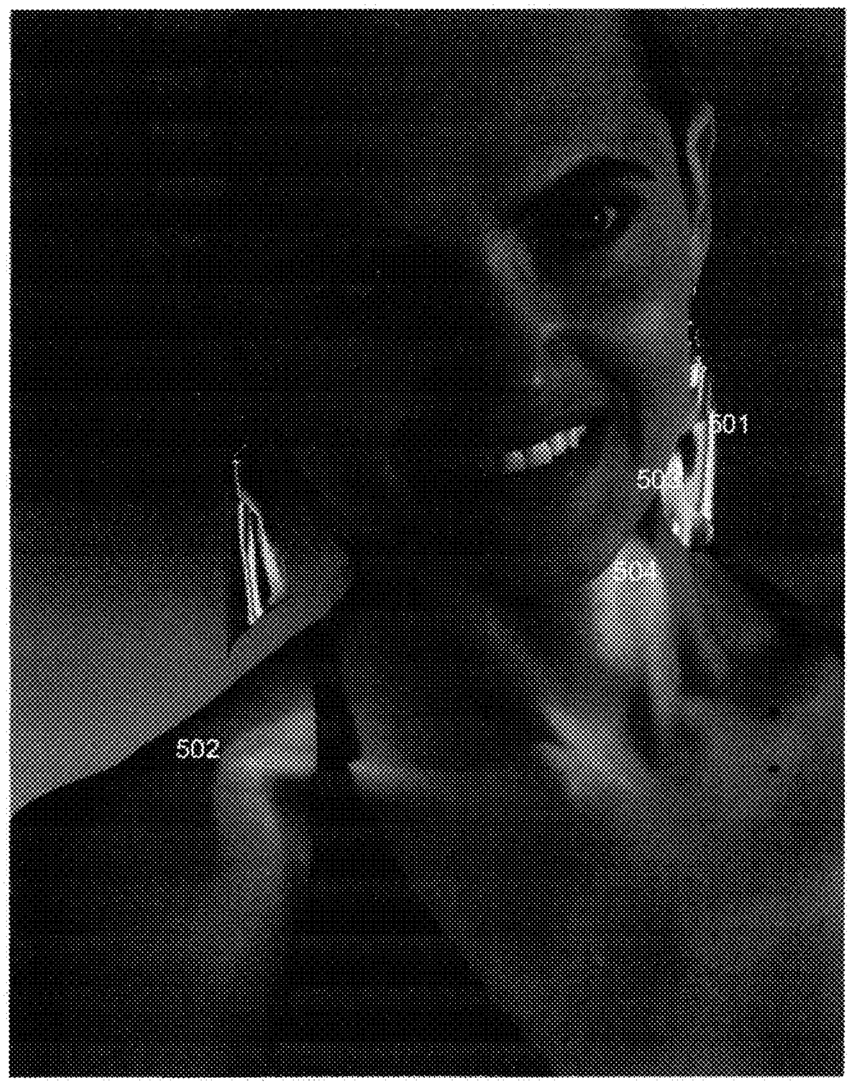
FIG. 5 is an example of the bullet earrings embodiment of the invention.
Figure 5A:
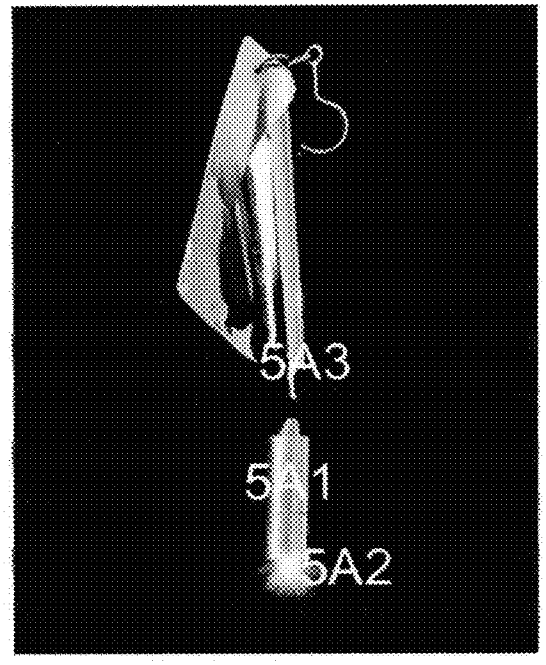
FIG. 5A shows detail of the internal "bullet" of FIG. 5

The earrings of FIG. 5 contain miniature flashlights or "bullets" (seen in FIG. 5A which shows detail of the internal "bullet" of FIG. 5) 5A1 that throw a lensed 5A2 focused warm white light of particular skin enhancing color downward from the wrap around cylindrical housings (shown in FIG. 5) 501 towards the shoulders 502 and décolletage of the wearer. In this preferred embodiment (FIG. 5A) the inside diameter of the tubular earring housing is designed to hold the "bullet" through the tension of the metal 5A3. Shown in FIG. 5 the interior surfaces of the gold tube are also illuminated by the internal light source adding an attractive self illuminating feature 503 plus said light reflected from the gold surfaces adds interesting shapes and color to the adjacent skin where it is thrown 504.

Figure 6:
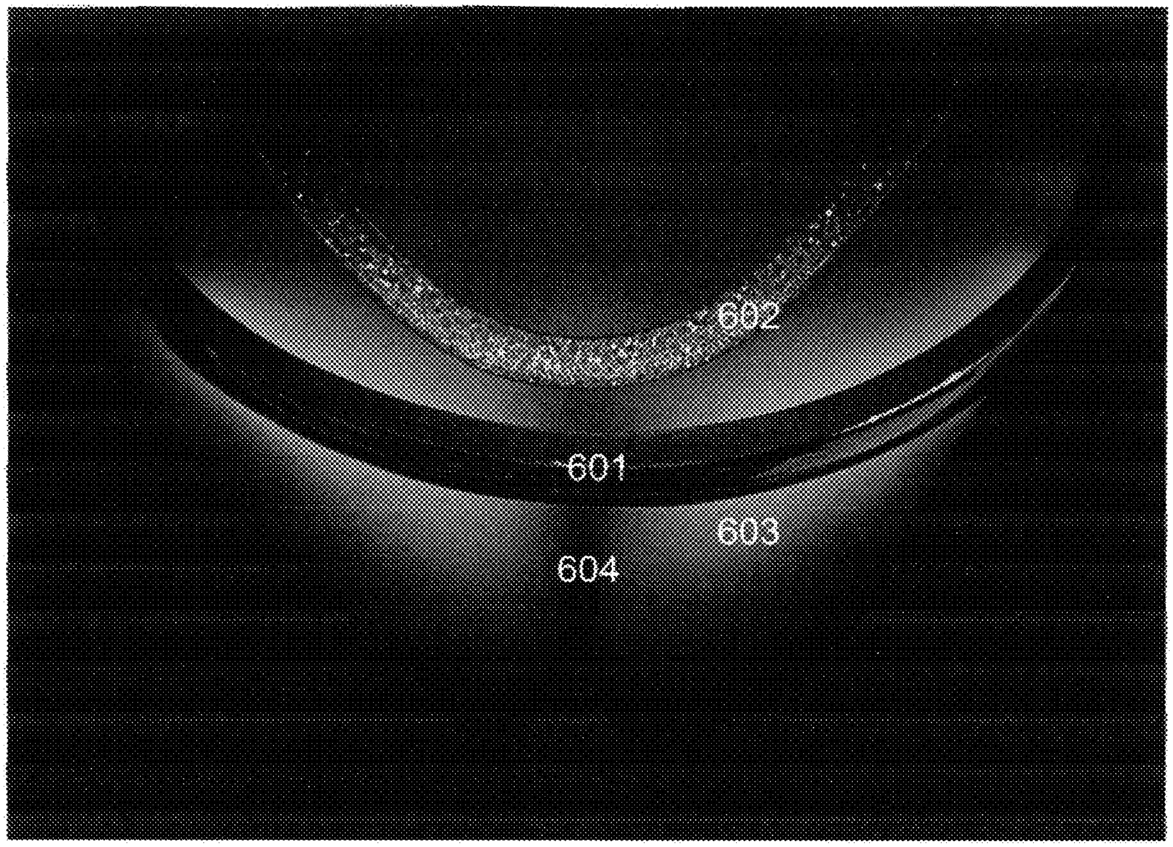
FIG. 6 is an example of the light tube embodiment of the invention.

FIG. 6 shows the concave metal band (lower) 601 that contains a light ribbon where outwardly facing LEDs along it's length illuminate the adjacent Swarovski crystals contained in the necklace (upper) 602. Additional effect is achieved by light falling on the wearers breasts 603 thus creating the illusion of increased cleavage 604.

Figure 7:
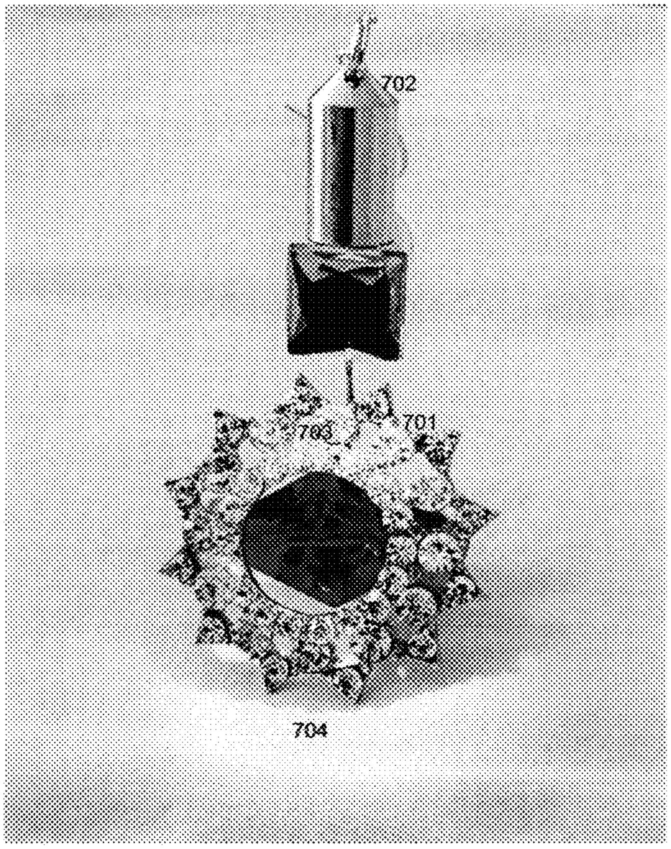
FIG. 7 is an example of the front/side light scraping embodiment of the invention.
Figure 7A:
FIG. 7A shows the jewel in FIG. 7 illuminated from behind to cause the translucent stone to appear to glow

As shown in FIG. 7 "scraping" side/front light along the surfaces of faceted stones, crystals 701 or diamonds can be accomplished with built in light source(s) in the findings (fiber optic, LED or "bullet" flashlight as shown) 702 to create sparkle 703. The reflection or spill of any of this light 704 can add attractive and interesting illumination of the wearers adjacent skin. FIG. 7A (detail of FIG. 7) shows how backlight causes the translucent jewel to "glow" 7A1.

The invention claimed is:

1. A jewelry apparatus for illuminating skin of a wearer comprising:

a housing;

a light source, wherein the light source is predominately hidden in the housing;

the light source is configured to emit light onto the skin of the wearer through an opening in the housing; and a path of the light is unobstructed, except by the housing, to preserve all visible properties of the emitted light, including the visible properties imparted onto the light via reflection from an inside surface of the housing.

2. The jewelry apparatus of claim 1, wherein the visible properties imparted onto the emitted light include at least one of shape and color of the housing.

3. The jewelry apparatus of claim 1, wherein the housing is cylindrical and the opening is a cylinder base.

4. The jewelry apparatus of claim 1, wherein the housing is gutter-shaped and the light source is one of a plurality of warm, white light emitting diodes and a ribbon of the warm, white light emitting diodes.

5. The jewelry apparatus of claim 1, wherein the light source is configured to illuminate one of breasts and cleavage of the wearer.

6. The jewelry apparatus of claim 1, wherein the light source is one of a light emitting diode and a flexible ribbon of the light emitting diodes.

7. The jewelry apparatus of claim 1, wherein the housing is:

one of a necklace and ribbon;

one of suspended independently and attached to straps of a bra; and positioned proximate a collar bone.

8. The jewelry apparatus of claim 1, wherein the housing has a form of one of iconic period industrial chandeliers, household chandeliers, and pendant style hanging lamps.

9. The jewelry apparatus of claim 1, wherein the housing is a downward facing tubular earring and the light source is a bullet type miniature flashlight.

10. The jewelry apparatus of claim 1, wherein the light source is oriented downwards at a body of the wearer to project the light downwards onto one of the upper surfaces of the breasts and shoulders of the wearer.

11. The jewelry apparatus of claim 1, wherein the housing is a belly ring.

12. The jewelry apparatus of claim 1, wherein the light is projected onto one of adjacent jewelry or a free hanging cut crystal.

13. The jewelry apparatus of claim 1, wherein the light source emits a focused warm white light to enhance skin color at one of shoulders, breasts, and décolletage of the wearer.

14. A jewelry apparatus for illuminating skin of a wearer, where a quality of light is preserved, comprising:

a housing;

a light source, wherein the light source is predominately hidden in the housing;

the light source is configured to emit light onto the skin of the wearer through an opening in the housing; and a path of the illumination is unobstructed by crystals, gems, and jewels of at least partial transparency.

15. The jewelry apparatus of claim 14, wherein the housing is cylindrical and the opening is a cylinder base.

16. The jewelry apparatus of claim 14, wherein the light source is configured to illuminate one of breasts and cleavage of the wearer.

17. The jewelry apparatus of claim 14, wherein the light source is one of a light emitting diode and a flexible ribbon of the light emitting diodes.

18. The jewelry apparatus of claim 14, wherein the light source is oriented downwards at a body of the wearer to project the light downwards on to one of the upper surfaces of the breasts and shoulders of the wearer.

19. The jewelry apparatus of claim 14, wherein the light is projected onto one of adjacent jewelry or a free hanging cut crystal.

20. The jewelry apparatus of claim 14, wherein the light source emits a focused warm white light to enhance skin color at one of shoulders, breasts, and décolletage of the wearer.

* * * * *